July 11, 1939. H. F. TÖNNIES Re. 21,149

EXPOSURE APPARATUS FOR CAMERAS

Original Filed Nov. 19, 1934 2 Sheets-Sheet 1

Inventor.

Hans F. Tönnies,

By Potter, Pierce & Scheffler,

Attorneys.

July 11, 1939. H. F. TÖNNIES Re. 21,149

EXPOSURE APPARATUS FOR CAMERAS

Original Filed Nov. 19, 1934 2 Sheets-Sheet 2

Inventor:

Hans F. Tönnies,

By Potter, Pierce & Scheffler,

Attorneys.

Reissued July 11, 1939 Re. 21,149

UNITED STATES PATENT OFFICE 21,149

EXPOSURE APPARATUS FOR CAMERAS

Hans Ferdinand Tönnies, Hamburg-Grossflottbek, Germany

Original No. 2,051,061, dated August 18, 1936, Serial No. 753,752, November 19, 1934. Application for reissue October 24, 1938, Serial No. 236,829

24 Claims. (Cl. 95—64)

This invention relates to exposure apparatus for cameras, and more particularly to photoelectric apparatus for facilitating the proper exposure of the negative, either by indicating that adjustment of the diaphragm or shutter speed which is appropriate for the light conditions then existing or by automatically making the necessary adjustment.

Objects of the invention are to provide exposure apparatus for cameras which is of relatively small size and which may be incorporated in or located adjacent the usual lens and diaphragm assembly with little or no increase in the size of the camera. An object is to provide photoelectric exposure apparatus for cameras which may serve both as an exposure meter and as an automatic diaphragm, the apparatus preferably being so constructed that the exposure meter portion of the apparatus affords a visual indication as to whether or not the brightness of the scene to be photographed is in excess of that critical value which will permit use of the automatic diaphragm. A further object is to provide photoelectric apparatus for incorporation in a camera adjacent the usual lens and diaphragm assembly, the photoelectric apparatus including an electrical measuring instrument actuating a plurality of diaphragm blades, the measuring instrument and blades being so related that the diaphragm blades can not decrease the maximum lens opening unless the measured brightness of the scene to be photographed exceeds that critical value for which the maximum lens opening and a predetermined snapshot time of exposure are appropriate. Other objects relate to the provision of exposure apparatus including an electrical measuring instrument having a single magnetic circuit and a plurality of moving systems which carry diaphragm blades, the magnetic circuit being of approximately annular form to permit the mounting of the electrical instrument in the lens and shutter assembly of a camera without substantial increase in the size thereof.

These and other objects and advantages of the invention will be apparent from the following specification when taken with the accompanying drawings in which.

Figure 1:
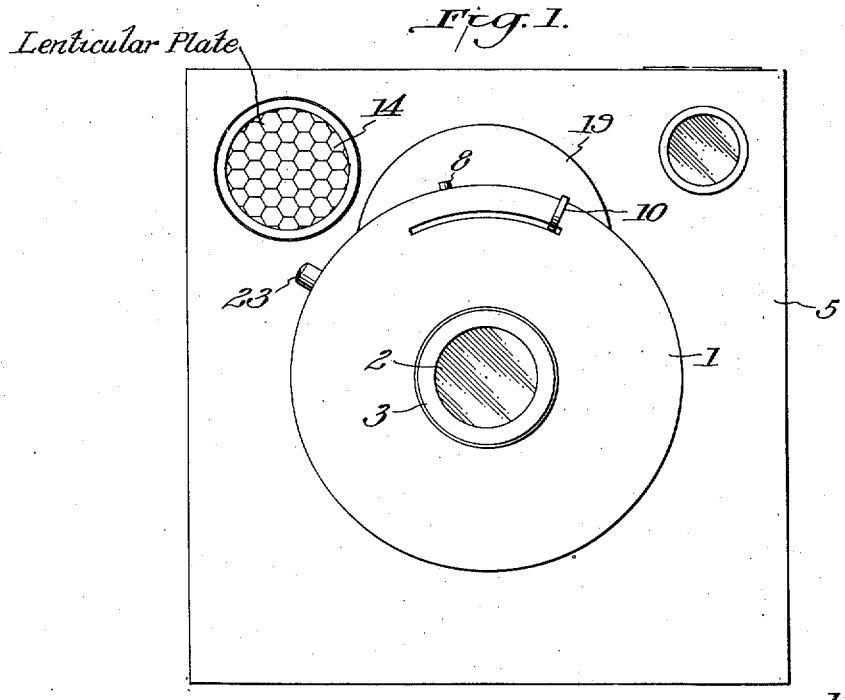
Fig. 1 is a front elevation of a camera provided with photoelectric exposure apparatus embodying the invention.

In the drawings, the reference numeral 1 identifies the casing or lens tube which supports lenses 2, 2′ that are carried by the usual ring mountings 3, 3′, the casing having a threaded sleeve 4 or other appropriate means at its inner end for attaching the casing to a camera 5. In addition to the lenses, the casing houses appropriate mechanism such as shutter 6 and an iris diaphragm 7 for controlling the exposure of the negative. The shutter mechanism includes pin 8 which extends to the exterior of the casing and is adjustable along a scale 9 which is graduated in the usual manner to indicate the exposure period for snapshots or "instantaneous" exposures, and also the settings for time and bulb exposures. The diaphragm 7 is similarly provided with an indicating arm or pointer 10 which is displaceable along a graduated scale 11 to adjust the effective aperture of the lens system. The mechanism for actuating the shutter and diaphragm is positioned, as is customary, in the forward end of the casing 1 and may be of any known or desired design. The exact constructions of the lens, shutter and diaphragm mechanism are not important and may be varied at will without affecting the present invention. The known forms of combined shutter and diaphragm may be used, for example, in place of the separate units.

In accordance with this invention, an electrically actuated exposure mechanism is mounted in the casing or lens tube 1, such mechanism preferably including a compact measuring apparatus for indicating, in terms of time or of lens aperture, a factor which affects the exposure, and also an automatic diaphragm mechanism. This apparatus is energized by the current developed by a photocell 12 which may be, and preferably is, of the current-generating type, the cell being mounted on the camera body 5 behind means, such as a multiple compartment baffle 13 and multiple lens plate 14, for restricting the beam of light rays which reaches the photocell to approximately the image angle of the camera. This type of light restricting means is described and claimed in my copending application Serial No. 728,573, filed June 1, 1934, now Patent No. 2,067,843.

Figure 2:
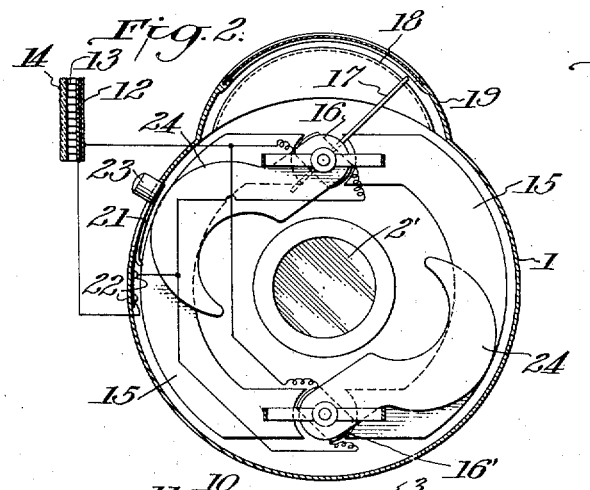
Fig. 2 is a transverse section through the lens and shutter assembly as viewed on line 2—2 of Fig. 3, the automatic diaphragm and exposure meter elements being shown substantially in elevation and the photosensitive device being shown in central section and turned through 90° for the better illustration of the electrical connections.
Figure 4:
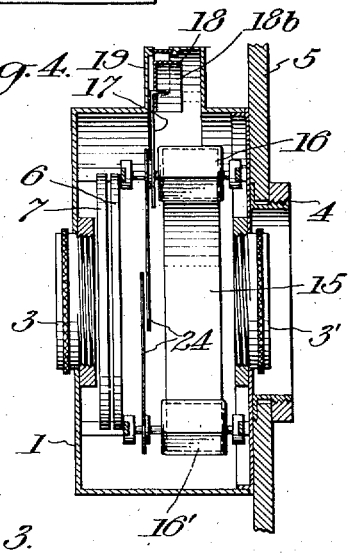
Figs. 3 and 4 are respectively a top view and a longitudinal section through lens, shutter and exposure apparatus.
Figure 3:
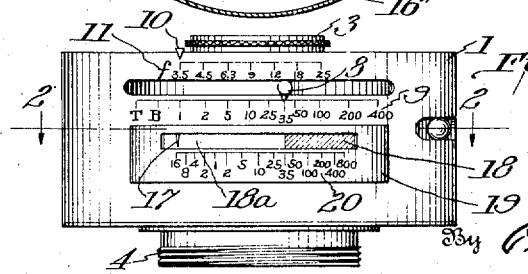

As shown in Figs. 2 and 4, the measuring instrument includes two permanent magnets 15 of approximately semi-annular form which constitute a single magnetic circuit with two air gaps in which the moving coils 16, 16′ are pivotally mounted. This particular form of magnetic field structure is of small size and makes it possible to locate the entire assembly within the lens and shutter casing 1. The field magnets surround the axis of the casing and, obviously, the magnets are arranged with their unlike poles in proximity. The moving system 16 carries a pointer 17 having a bent end which moves over an indicator plate 18 within the upper portion 19 of the casing, the pointer end moving along and adjacent the inner face of the casing to cooperate with a scale 20 on the exterior surface of the projecting circular wall 19 of the casing. The scale 20 may be graduated in terms of one of the factors, time or diaphragm opening, which affect the exposure and, in Fig. 3, a time scale ranging from 16 seconds to $\frac{1}{800}$ second is illustrated.

The electrical connections between the photocell 12 and the moving coil systems are shown diagrammatically in Fig. 2, such connections including the switch arm 21 which cooperates with the spaced switch points 22 to open and close the circuit, the arm being adjustable by a knob 23 which extends to the exterior of casing 1. When the switch is closed, the moving systems 16, 16′ are displaced in accordance with the brightness of the scene toward which the camera and the photocell are directed, and the position of the pointer 17 on the scale 20 indicates the appropriate value of one exposure factor when the other exposure factors have definite preselected values. The illustrated time graduations of scale 20 correspond, for example, to an assumed film speed of 20° Scheiner and an assumed maximum diaphragm opening of *f*3.5. The corresponding graduations of the shutter speed scale 9 and the exposure meter scale 20 are preferably in axial alinement. The three exposure factors are so related that, if it is preferred to assume definite values for film speed and exposure time, the scale 20 may be graduated in terms of diaphragm openings. As will be described hereinafter, this measurement of the scene brilliancy, in terms of one factor for assumed values of the other factors, may be converted into an equivalent relationship of other values of the three factors by means of a computer.

The measuring apparatus also includes an automatic diaphragm since each moving system 16, 16′ has fixed thereto a sickle-shaped diaphragm blade 24 of light material, such as hard rubber, a molded synthetic resin or a thin blackened sheet of brass or aluminum. In the absence of all current supply to the measuring apparatus, the inner semi-circular edges of the diaphragm blades are radially spaced by a substantial distance from the adjacent edges of the lens assembly. The spacing permits a substantial angular displacement of the moving systems to take place before the effective diaphragm opening is decreased by the movement of the diaphragm blades into the path of the light beam between the camera lenses. This delay in the reduction of the diaphragm opening is necessary for proper operation of an automatic diaphragm since the apparatus must be designed for one predetermined exposure period and, obviously, no decrease in the opening must take place until the scene brightness exceeds that critical value which corresponds to a full diaphragm opening and the predetermined exposure time. The illustrated apparatus was designed for a normal snapshot exposure of $\frac{1}{35}$ second, but it will be apparent that any other value may be selected for the predetermined normal exposure period. Reverting to the indicator plate 18, it will be noted that the plate is divided into two significant areas 18ᵃ, 18ᵇ, preferably of contrasting color, which meet at the $\frac{1}{35}$ second graduation on scale 20. The significance of these regions of plate 18 is that, when the camera is directed towards a scene and the pointer 17 fails to move out of the region 18ᵃ, the operator knows that the light is below that critical value which will give a proper exposure of the film when the shutter is set for the predetermined speed of $\frac{1}{35}$ second. Under such conditions, the indicated longer exposure must be used or, for less than the maximum diaphragm opening, the exposure time must be correspondingly increased beyond the indicated value.

Figure 5:
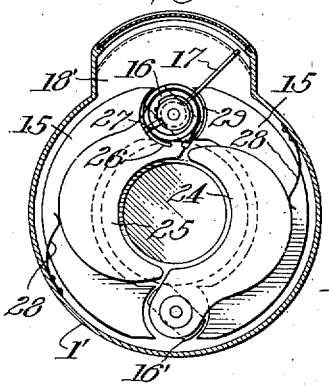
Fig. 5 is a sectional view, similar to Fig. 2, of another form of automatic diaphragm construction.
Figure 6:
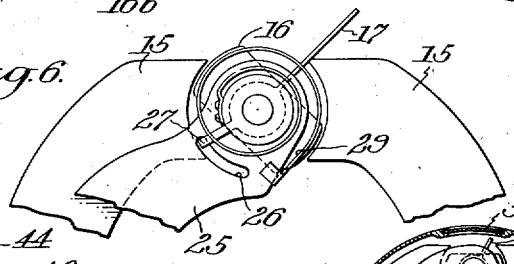
Fig. 6 is an enlarged fragmentary view of the moving coil and blade assembly of Fig. 5.

The diameter of the lens tube 1 may be somewhat reduced or, alternatively, larger diaphragm openings may be had with the same maximum casing diameter by providing a lost motion connection between the moving coil system 16 and the diaphragm blade 25, Figs. 5 and 6. This blade is pivotally mounted with respect to the moving coil 16 and has a slot 26 for receiving the bent end of an arm 27 which is fixed to the moving coil. The moving coil 16 which carries the exposure meter pointer 17 may therefore return to its normal zero current position but this outward movement of the diaphragm blade 25 and of the moving coil 16′ and its blade 24 is arrested by spring stops 28 as soon as the blades have moved to clear the maximum lens opening. The blade 25 is returned to full open position by a coil spring 29 which has its inner end fixed to the moving coil system, the outer end of the spring being forked to fit over the edge of the blade. The operating characteristics of both moving coil systems are substantially the same and the length of the slot 26 in blade 25 is such that the initial closing movement of both blades takes place when the current supply to the measuring apparatus rises above the critical brightness value which brings the pointer 17 into alinement with the dividing line between the two regions of the indicator plate 18.

Figure 7:
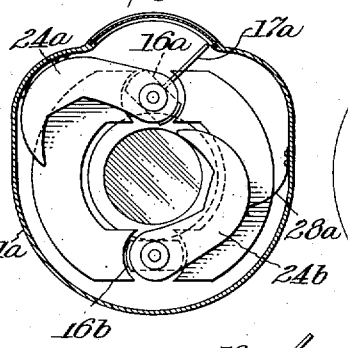
Fig. 7 is a sectional view of another form of the invention.

An alternative compact arrangement for obtaining a full range of movement of the coil 16ᵃ and pointer 17ᵃ is shown in Fig. 7. The upper portion of the casing 1ᵃ is enlarged to permit the blade 24ᵃ, of the upper moving system 16ᵃ, to be withdrawn from the lens opening when the measured brightness is below the critical value corresponding to the preselected shutter speed. As in the Fig. 5 construction, the lower moving system $16^b$ and diaphragm blade $24^b$ engage the stop $28^a$ when the blade $24^b$ is clear of the light passage through the lens tube. It will be noted that the inner edges of the blades $24^a$, $24^b$ are defined by three straight lines which form a semi-hexagonal recess, the blades thus cooperating to produce a substantially hexagonally shaped opening which, for optical reasons, is to be preferred when only two blades are employed. Upon increasing current flow, the moving coil $16^a$ rotates to move blade $24^a$ towards the lens, and both coils and their blades are rotated when the measured brightness exceeds the value for which a decreased diaphragm opening is appropriate.

Figure 8:
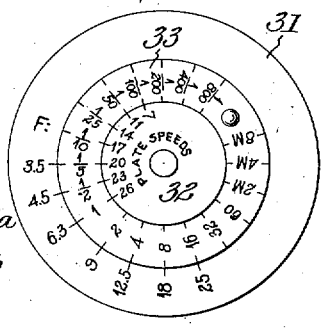
Fig. 8 is a plan view of a rotary disc calculator.

If the operator wishes to employ a film speed and/or a shutter speed which differ from the preselected normal values, the computer shown in Fig. 8 may be employed to convert the observed reading of scale 20 into other equivalent data. The computer includes the stationary disks 31, 32 which are marked in terms of diaphragm openings and film speed, and the intermediate disk 33 which has a time or shutter speed scale. The film speed value for the type of film most commonly used, for example, the value 20° Scheiner, is in line with the maximum lens opening, f3.5, and the computer is operated by adjusting the disk 33 to bring the observed time reading, as indicated by the pointer 17 and scale 20, into alinement with these selected normal values. The illustrated setting of the computer is correct for an observed reading of 1/5 second. The alined portions of the several scales then indicate the proper exposure data for other film speeds and/or smaller diaphragm openings.

Since this observed reading is more than the selected snapshot setting of 1/35 second, the operator knows that the automatic shutter blades are not operative to decrease the maximum aperture. When the brightness of the scene is such as to bring the pointer 17 into the region $18^b$ of the indicator plate, the operator may use the normal 1/35 second exposure and the automatic diaphragm, or may use any combination of stop and shutter speed by first moving switch arm 21 to open the electrical circuit. By setting the computer disk 33 to bring the observed time reading, say 1/100 second, in line with the corresponding diaphragm opening of f3.5 and 20° film speed, other combinations of the three exposure factors may be read from the computer disks.

Figure 9:
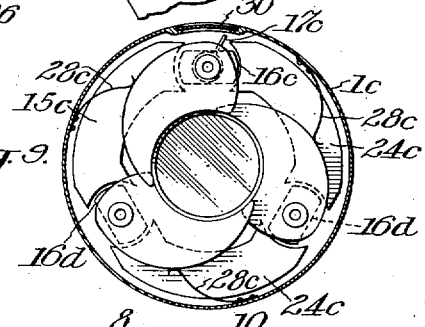
Figs. 9 and 10 are sectional views of additional embodiments of the invention.

The measurement of brightness values is not necessary when the camera is provided with a shutter having a fixed exposure period, as is the case with various types of motion picture cameras. As shown in Fig. 9, the mechanism includes three permanent magnets $15^c$ forming the field structure for the moving coils $16^c$, $16^d$ which have diaphragm blades $24^c$ rigidly fixed thereto. Spring stops $28^c$ engage the blades to arrest the opening movement as soon as the blades pass slightly beyond their maximum opening positions. The moving coil $16^c$ carries a short pointer $17^c$ which is concealed by the casing $1^c$ when the blades are fully open, the pointer moving into view through the window 30 when the scene is of such brightness that the measuring apparatus produces an appreciable closing movement of the blades. This particular form of the invention includes three overlapping blades but it is to be understood that any desired number of blades may be used.

Figure 10:
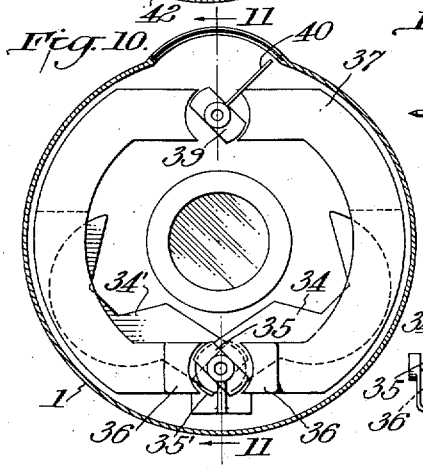
Figure 11:
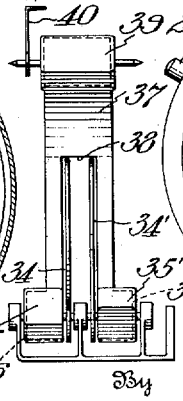
Fig. 11 is a fragmentary vertical section on line 11—11 of Fig. 10.

As shown in Figs. 10 and 11, the blades 34, 34' are carried by coil systems 35, 35' that are in axial alinement and pivotally mounted in the gaps between the two sets of pole pieces 36, 36' of a magnetic field system 37. The direction of current flow through the moving coils is such that the coils turn in opposite directions. The general arrangement is similar to that of Fig. 2 in that the blades and moving coils are rigidly connected and the blades therefore have a substantial range of idle movement before the opening is reduced in size. The magnet is therefore slotted, as indicated at 38, to permit the necessary outward movement of the blades. When the pin and slot construction of Figs. 5 and 6 is employed, this slotting of the magnet will not be necessary and a single set of pole pieces may be employed.

It will be noted that a separate coil system 39 is provided for the exposure meter pointer 40. This is an alternative for the described arrangements in which one moving system carries both the pointer and one of the diaphragm blades.

Figure 12:
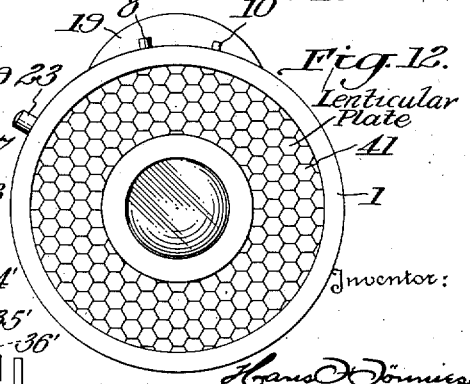
Fig. 12 is a front elevation of an embodiment of the invention in which both the photosensitive apparatus and the automatic exposure apparatus are incorporated in the lens tube or casing which houses the lenses and shutter of the camera.

An exceedingly compact arrangement of the exposure meter and automatic diaphragm may be had by mounting the photoelectric cell structure on the outer end of the lens tube or casing 1, as shown in Fig. 12. The cell and lens plate construction described in my copending application makes a comparatively thin assembly which need not increase the overall length of the lens tube. The cell and lens plate 41 are of annular form and lie between the front lens ring 3 and the outer edge of the casing 1.

Whether or not the diaphragm blades are provided for an automatic control of the diaphragm opening, it is novel, so far as I am aware, to arrange the measuring apparatus of an electrically actuated exposure meter within a lens tube of the usual design. The advantage of this design is that the moving pointer of the exposure meter travels over a scale that is closely adjacent the shutter and diaphragm scales. It is therefore to be understood that this invention contemplates a use of the exposure meter elements without the automatic diaphragm blades just as, see Fig. 9, the automatic shutter features may be usually employed whether or not the exposure meter features are present.

Figure 13:
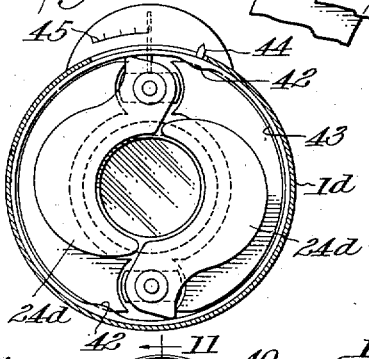
Fig. 13 is a fragmentary sectional view of a combined automatic and manually adjustable diaphragm.

The functions of the automatic diaphragm and of a manually adjustable diaphragm may be combined by providing means for mechanically moving the automatic diaphragm blades into the desired positions. As shown in Fig. 13, the outer ends of the diaphragm blades $24^d$ extend into the path of movement of the lobes 42 which project inwardly from the ring 43 that is rotatable in the lens casing $1^d$. The ring 43 has a pointer 44 which projects through the casing wall to cooperate with a graduated scale, 45, of diaphragm openings.

The several illustrated forms of the invention are indicative of the wide range of latitude in the design and construction of the novel exposure apparatus and it is to be understood that many changes may be made in the design, construction and relative location of the various elements without departing from the spirit of my invention as set forth in the following claims.

I claim:

1. Exposure apparatus for photographic purposes and of the type including an electrical measuring instrument adapted to be energized by photosensitive means responsive to the brightness of the scene to be photographed, characterized by the fact that said apparatus is mounted adjacent the lens of the camera, and said instrument includes indicating means divided into two ranges corresponding to those values of the brightness of an object to be photographed which lie below and above, respectively, the critical brightness value for which a film of preselected film speed will be properly exposed by a preselected combination of diaphragm opening and shutter speed.

2. Exposure apparatus as claimed in claim 1, wherein said measuring instrument includes a plurality of diaphragm blades for controlling the effective diaphragm opening, said blades restricting the maximum opening only when the brightness of the object to be photographed exceeds the said critical value.

3. Exposure apparatus as claimed in claim 1, in combination with an adjustable shutter, an adjustable diaphragm, and means for rendering the measuring instrument inoperative.

4. Exposure apparatus as claimed in claim 1, wherein the photosensitive means is located around the lens at the outer end of the lens tube.

5. Exposure apparatus as claimed in claim 1, wherein the electrical instrument comprises a plurality of moving coil systems and a single magnetic circuit therefor.

6. In a diaphragm, the combination with a camera lens, a plurality of diaphragm blades for adjusting the effective lens opening, and measuring apparatus including a plurality of moving coils for actuating said blades, said measuring apparatus being adapted to be energized by photosensitive means responsive to the brightness of the object to be photographed, of means preventing said measuring apparatus from moving said diaphragm blades into the path of the light rays passing through said lens until the current supply to said measuring apparatus rises above a critical value corresponding to a predetermined brightness appropriate for a preselected combination of film speed, lens opening and shutter speed.

7. A diaphragm as claimed in claim 6, in combination with a pointer actuated by said measuring apparatus and a scale cooperating with said pointer to measure one exposure factor for a preselected film speed and preselected value of the other exposure factor.

8. In an automatic diaphragm for a camera lens, an electrical measuring apparatus having a plurality of coil systems, a diaphragm blade carried by each coil system, means mounting a coil system for free pivotal movement between a no-current position and a maximum-current position in accordance with the magnitude of the current passed through said coil system, means mounting the remaining coil systems for pivotal movement, stop means arresting the opening movement of the diaphragm blades carried by said remaining coil systems when the said blades are clear of the maximum lens opening, a pointer on the coil system which is mounted for free pivotal movement, and a scale cooperating with said pointer and graduated in values that vary as a function of brightness, whereby said pointer and scale indicate measured values below that critical brightness value for which said diaphragm blades are moved to provide the maximum lens opening.

9. The combination with the lens of a camera, and a casing housing said lens and adapted to be secured to a camera; of an automatic diaphragm comprising electrical measuring apparatus adjacent the lens and having a plurality of moving coil systems, a diaphragm blade carried by each of said coil systems, a single magnetic field system surrounding the axis of said lens and cooperating with all of said coil systems, and a pointer carried by one of said moving coil systems and movable over an indicator plate, said measuring apparatus being adapted to be energized by photosensitive means responsive to the brightness of the scene to be photographed.

10. The invention as claimed in claim 9, in combination with manually adjustable diaphragm and shutter means, and means for preventing operation of said automatic diaphragm.

11. The invention as claimed in claim 9, wherein said plate is divided into two areas corresponding to ranges of brightness above and below that critical brightness value appropriate for a preselected combination of film speed, diaphragm opening and time of exposure.

12. The combination with the lens of a camera, and a casing housing the lens and adapted to be secured to a camera, of an automatic diaphragm comprising electrical measuring apparatus adjacent said lens and adapted to be energized by photosensitive means responsive to the brightness of the scene to be photographed, said measuring apparatus having a plurality of moving coil systems each carrying a diaphragm blade, and a single magnetic field system surrounding the axis of said lens and cooperating with all of said coil systems, and means for preventing operation of said automatic diaphragm.

13. The invention as claimed in claim 12, wherein said means for preventing operation of said automatic diaphragm retains the said diaphragm blades in fully opened positions.

14. In an automatic diaphragm, the combination of a casing having spaced lens elements defining a light passage through the casing, an electrical measuring apparatus within said casing having a plurality of coils each pivoted on an axis parallel to the axis of the light passage and means forming a single magnetic circuit cooperating with all of said pivoted coils, and a diaphragm blade connected to each coil and actuated thereby in a plane normal to the coil axis and between said lens elements, the inner edges of said diaphragm blades cooperating to define an approximatley circular aperture when said moving coils displace the respective diaphragm blades into positions corresponding to the full diameter opening of the camera lens.

15. An automatic diaphragm as claimed in claim 14, wherein there are two diaphragm blades, and the inner edge of each blade is defined by three straight lines that form a semi-hexagonal recess in the blade.

16. An automatic diaphragm as claimed in claim 14, wherein each blade is fixed to its associated moving coil, the inner edges of said blades being spaced from said light passage when said moving coils are not energized.

17. An automatic diaphragm as claimed in claim 14, in combination with an indicator plate, a pointer carried by one of said moving coils, a lost motion connection between the said coil and its blade, and means for arresting the opening movement of that blade when it clears the said light passage, the said indicator plate being divided into two significant areas corresponding, respectively, to the ranges of movement of the said moving coil when said blade is stationary and when it is actuated by the said moving coil.

18. An automatic diaphragm as claimed in claim 14, wherein said blades are fixed to their associated moving coils and that one of said moving coils carries a pointer, said casing having a window opening through which said pointer is visible substantially only when said moving systems are displaced to such extent as to move said diaphragms into said light passage.

19. Photographic apparatus comprising the combination with a lens tube and a lens having the mounting ring thereof secured to the front end of said lens tube, of exposure apparatus including a photoelectric cell supported by said tube and rearwardly of the front end thereof.

20. Photographic apparatus comprising the combination with a lens tube housing the lens of a camera, of exposure apparatus and a photoelectric cell supported by and at the front end of said tube; said exposure apparatus including a plurality of blades adjacent said lens and means energized by said cell to actuate said blades to restrict the opening through said tube when the brightness of the object to be photographed exceeds that critical value for which a preselected exposure period is appropriate for a preselected film speed and the maximum opening.

21. Exposure apparatus comprising the combination with a casing housing a camera shutter and means for adjusting the shutter speed, said means including a scale of shutter speeds at the exterior of the casing and an adjusting member cooperating with said scale, of an electrically actuated exposure meter within said casing, said exposure meter including a pointer and a scale graduated in terms of an exposure factor, said exposure meter scale being carried by said casing adjacent said shutter speed scale.

22. An automatic shutter for a camera, comprising a pair of pivoted diaphragm blades, and electrical measuring apparatus for adjusting said blades, the inner edges of said blades having similar semi-hexagonal recesses which cooperate to from a substantially hexagonal opening.

23. Diaphragm apparatus for use with a camera lens, comprising a plurality of diaphragm blades, electrical measuring apparatus including moving coils for actuating said blades, and manually adjustable means to set said blades mechanically to any desired stop opening.

24. Exposure apparatus for photographic purposes and of the type including an electrical measuring instrument adapted to be energized by photosensitive means responsive to the brightness of the scene to be photographed, characterized by the fact that said apparatus is mounted adjacent the lens of the camera; and said instrument includes a movable pointer cooperating with indicating means including scale divisions corresponding to preselected increments of brightness values and graduated in values of one exposure factor, viz., diaphragm opening or shutter speed, and means dividing said scale divisions into two ranges corresponding to those values of brightness which lie above and below, respectively, the critical brightness value for which one preselected and fixed exposure period is appropriate for one preselected and fixed film speed at the maximum diaphragm opening of the camera lens.

HANS FERDINAND TÖNNIES.